United States Patent [19]
Walker

[11] Patent Number: 5,825,538
[45] Date of Patent: Oct. 20, 1998

[54] PLACEMENT TOOL FOR RETRO-REFLECTIVE CALIBRATION POINTS

[75] Inventor: Joe L. Walker, Salt Lake City, Utah

[73] Assignee: Evans & Sutherland Computer Corp., Salt Lake City, Utah

[21] Appl. No.: 802,326

[22] Filed: Feb. 18, 1997

Related U.S. Application Data

[62] Division of Ser. No. 685,154, Jul. 23, 1996, Pat. No. 5,638,208.

[51] Int. Cl.[6] ........................................ G03B 21/56
[52] U.S. Cl. ............................. 359/451; 359/443
[58] Field of Search ..................... 359/443, 451

[56] References Cited

U.S. PATENT DOCUMENTS 4,500,163   2/1985   Burns et al. ..................... 350/3.7

*Primary Examiner*—Daniel P. Malley
*Attorney, Agent, or Firm*—Thorpe, North & Western, LLP

[57] ABSTRACT

In a multiple-projector concave-screen display system, spacial alignment of images on the screen, is enabled by designating calibration points with retro-reflective dots and illumination markers. The manufacture of the screen involves locating calibration points and depositing the dots with a tool utilizing a rotary mechanism for loading and applying the dots from solenoid actuated pod units. Areas for retro-reflective dots, versus illumination markers, are defined on the basis of reflectance angles between vectors to the screen from a projector and from the screen to a viewer.

6 Claims, 5 Drawing Sheets

PLACEMENT TOOL FOR RETRO-REFLECTIVE CALIBRATION POINTS

RELATED SUBJECT MATTER

This application is a division of application Ser. No. 08/685,154, filed Jul. 23, 1996, entitled "PROJECTION SCREEN WITH RETRO-REFLECTIVE CALIBRATION POINTS, PLACEMENT TOOL AND METHOD now U.S. Pat. No. 5,638,208."

Generally, the present invention relates to a placement tool for calibration points for use on projection screen structures in systems requiring spatial alignment of multiple images.

For large light displays, projection display systems typically employ more than one projector (television or film) to provide wide field-of-view imagery with the required combination of resolution and brightness. In various systems, the projector either may move or remain stationary. In either event, the projectors, and their imagery, should have good spatial alignment to provide seamless transition of imagery between projectors.

To accomplish spatial alignment between projectors, it has been proposed to provide marked calibration points on the screen. Generally, the markers for calibration points should meet certain requirements. Specifically, the markers should provide sufficient contrast with the projected imagery so as to be clearly and distinctly seen. Also, the markers should be small enough not to be obvious in the projected scene (create a distraction). Additionally, it should be possible to "turn off" the contrast of the calibration markers when the calibration is completed.

Historically, calibration points have been marked by small lights, e.g., Light Emitting Diodes (LED's) or the terminal ends of fiber optics bundles illuminated from an external source. Although such devices are satisfactory for alignment operations, their installation and use involve considerable hardware and sizable labor costs. Specifically, to install the light devices, initially holes must be drilled through the display screen structure, e.g. dome, so that an illuminator device (LED or fiber optic) can be fixed in position. In view of the size of the screen structures, scaffolding usually is required for access to calibration points to install the illuminator devices. As a further inconvenience, typically, one person is required to drill the holes while a second person (using a surveying instrument) is required to guide the first person in locating the precise position of the holes. Each illuminator device then must be mounted and interfaced to a power or light source, often requiring complex wiring or fiber optics, electrical interfaces and controls. Accordingly, a substantial need exists for an improved process and structure for accomplishing calibration-point markers on a projection surface.

Generally, the system of the present invention involves the utilization of directional reflecting materials (retro-reflective materials) to mark calibration points for image alignment. As a characteristic, retro-reflective materials return most of the illumination directly back to the originating light source. Forms of retro-reflective materials are well known and are used in industry as for signs, safety reflectors and so on. Note that the characteristic of the material is quite independent of surface tilt relative to the incident light over large incidence angles. If an observer is close to the source, the returned illumination is quite high. However, if the observer displaced from the source, the illumination is quite dim.

In accordance herewith, as disclosed in a detailed embodiment, small dots of retro-reflective material are adhesively secured to mark calibration points on an image screen. As indicated, during normal viewing, it is desirable that the contrast between such dots and the projected scene not detract from the scene content. In that regard, the physical arrangement of many projection systems is such that the viewer is well removed from the projector. That is, for many areas of projection displays, there is sufficient separation between the projector and the viewer (demanded by the physical size of the projection hardware) that the viewer will not perceive the retro-reflective dots. Accordingly, the reflected projector illumination from the retro-reflective dots is quite dim and somewhat invisible to the viewer in the projected scene. Stated another way, if the gain (from the viewer location) of the dots is less than that of the surrounding screen material, the dot brightness will be lower than the surrounding scene imagery and not be noticeable.

During spatial alignment or calibration, the viewer can wear a headlamp providing a light source near the viewer's eyes. Consequently, the separation or angle between a vector from the light source to the calibration mark and a vector from the reflectance to the viewer's eyes would be small. Therefore, the reflectance from the markers would be high and easily visible to the viewer in the projected scene.

In some projection systems, as explained in detail below, retro-reflective markers at some locations may present a distraction. Such calibration points may be identified as disclosed herein and an alternative form of device, e.g. an LED illuminator, may be employed.

To place retro-reflective markers on the screen, without the necessity of scaffolding, a placement tool in accordance herewith is disclosed below. Generally, individual markers, for example in the form of small dots, are punched from a sheet of medium, then positioned to be adhesively secured at an identified location. Accordingly, depending on the nature of the projection system, the size of the screen, the number of projectors and other criteria, the system hereof affords an economical and convenient technique and apparatus for marking calibration points to spatially align images.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENTS

As required, detailed illustrative embodiments of the present invention are disclosed herein. However, specific structural forms and process operational steps may be embodied in different forms, some of which may be quite different from those of the disclosed embodiments. Consequently, the specific structural and functional details disclosed herein are merely representative; yet in that regard, they are deemed to afford the best embodiments for purposes of disclosure and to provide a basis for the claims herein which define the scope of the present invention.

Figure 1:
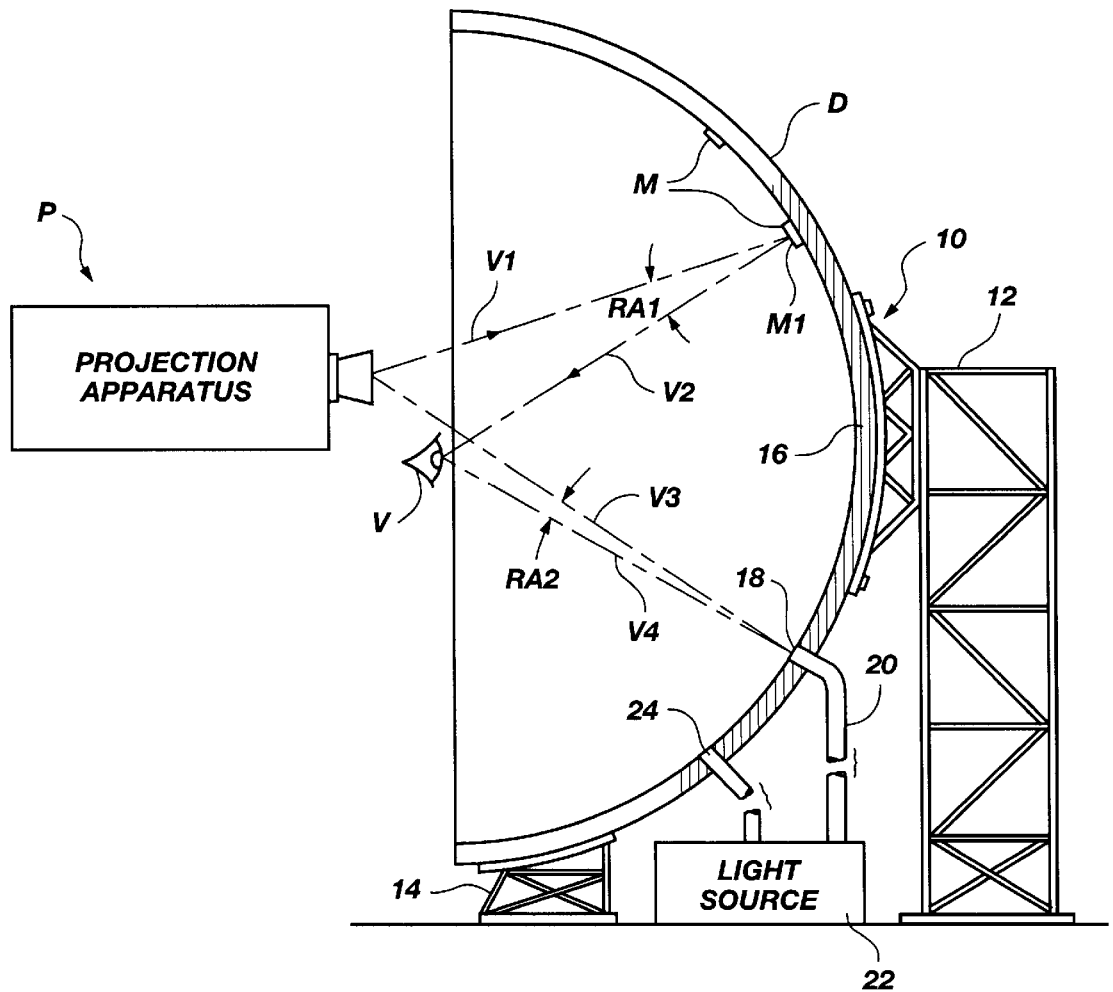
FIG. 1 is a partially sectional and diagrammatic view of a projection system in accordance with the present invention.

Referring initially to FIG. 1, a hemispherical fragment of a display dome D is shown, providing a concave surface to receive light images from a projection apparatus P. Note that the screen representations are not to scale, certain parts being grossly enlarged for the convenience of illustration. Also note that only a portion of the dome is illustrated in section.

Generally, the system of the present invention involves the placement of markers M on the dome D to identify calibration points, for example to be used as reference points in spatially aligning projected images. More specifically, the markers M comprise retro-reflective material with the peculiar characteristic of reflecting illumination primarily back to its source. Accordingly, as explained in detail below, substantial benefits are attained.

The projection apparatus P provides a display (not shown) for observation by a viewer V represented by an eye symbol. Although simply illustrated, the projection apparatus P may take the form of multiple projectors, either movable or stationary and for example may variously comprise television or film structures to attain a desired display on the dome D.

As indicated above, to attain quality displays, images from the projection apparatus P must be spatially aligned to provide a seamless transition from one image to another. To accomplish such alignment, calibration points (designated by the markers M) are utilized. As well known, such calibration points may be variously arranged and enable a variety of alignments in relation to an image or images from the projection apparatus P using otherwise well known techniques.

Considering the structure in greater detail, the dome D is part of a large structure 10 supported vertically and including a stanchion 12 and a base 14. The hemispheric configuration is merely exemplary and may be part of a complete dome. Alternatively any of a variety of non-linear shapes might be involved to define a projection screen. In any event, the projection apparatus P substantially fills the screen 16 with image subject matter to provide a display for perception by the viewer V.

Preparatory to actual operation of the projection apparatus P, alignment operations typically are involved using calibration points located on the screen 16 and designated by the markers M. As indicated, the markers are grossly enlarged with respect to the dome D.

The calibration points may lie in an array defining a grid or may be in other arrangements as known in the art. Essentially, the need is to designate the calibration points while the screen 16 is illuminated by a display, then "turn off" or otherwise make the markers unnoticeable to the viewer V. As indicated above, by providing the markers M in the form of retro-reflective dots, to some extent, these objectives are accomplished.

In one embodiment, retro-reflective dots of circular configuration having a diameter of one sixteenth of an inch were adhesively secured to the screen.16. To better "see" such markers M, a technician wore a headlamp. The light from the headlamp was reflected from the retro-reflective markers M back to the technician clearly indicating the calibration points. However, markers M at certain locations may be observed by the viewer v without the headlamp. A specific example will be treated.

Assume the projection apparatus P (FIG. 1) fills the entire screen 16 with imagery. Accordingly, for each point in the scene, reflectance angles are defined between the vector of received light and the vector of light reflected back to the viewer V. As shown in FIG. 1, a vector V1 represents light passing from the projection apparatus P to the marker M1 and a vector V2 represents light reflected from the marker M1 to the viewer V. Thus, a reflectance angle RA1 is defined between the vectors V1 and V2.

As illustrated, the reflectance angle RA1 is substantial, with a consequence that the viewer V will not "see" the marker M1. The marker M1 is not seen because light reflected from the marker M1 is primarily returned to the projector P thereby "missing" the viewer V.

Referring still to FIG. 1, a vector V3 extends from the projection apparatus P to a point 18 (considered below) on the screen 16. A vector V4 represents the light that would be reflected from a marker M (not shown) at the point 18 to the viewer V. A relatively small angle RA2 exists between the vectors V3 and V4. Consequently, a retro-reflective marker M at the point 18 likely would be seen by the viewer V during display.

For locations such as the point 18, in accordance herewith, an alternative illuminator is provided. Specifically as represented a fiber-optic bundle 20 is provided from a light source 22. In accordance herewith, other bundles, as bundle 24, are provided at select calibration points identified as will now be explained.

Figure 2:
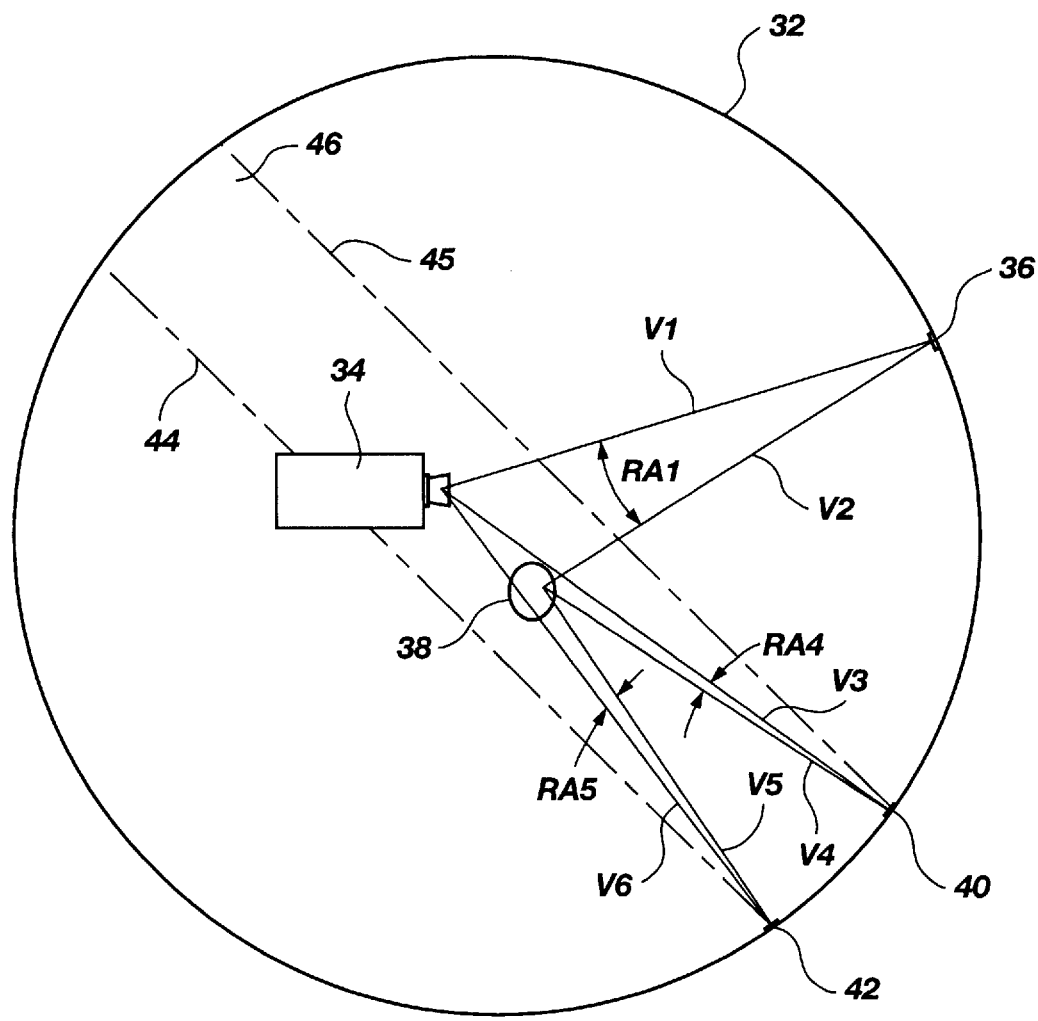
FIG. 2 is a diagrammatic view illustrative of a process step of producing the system of FIG. 1 in accordance with the present invention.

A complete dome screen 32 is represented in FIG. 2 with an internally mounted projection apparatus 34 for providing display images as explained above. Similar to the example explained with reference to FIG. 1, a vector V1 (FIG. 2) represents light from the projector 34 to a point 36 on the screen 32. A vector V2 represents light reflected from the point 36 to an observer 38. As explained above, the reflectance angle RA1 between the vectors V1 and V2 is sufficiently large that the viewer 38 will not noticeably "see" a retro-reflective dot at the point 36. However, consider other scene points at the screen 32.

Assume a progression of scene points moving downward from the scene point 36, ultimately to a scene point 40. As illustrated, a vector V3 represents light from the projector 34 to the point 40 and a vector V4 represents light reflected from the point 40 to the viewer 38. Note that the reflectance angle RA4 between the vectors V3 and V4 is quite small. Accordingly, the viewer 38 may be distracted by the presence of a retro-reflective dot at the scene point 40. Accordingly, a minimum reflectance angle may be defined for scene points, specifying angles for which a retro-reflective dot should not be used. That is, for reflectance angles above a minimum reflectance angle, retro-reflective dots may be employed without deterring from the projected image. For points with a reflectance angle below the minimum, alternative illuminations, e.g. fiber optic bundles or LED's should be used. In that regard, a band of minimum reflectance angles can be established for determining the calibration points to receive retro-reflective dots versus other illuminators.

Moving downward on the screen 32 from the scene point 40, it will be apparent that the reflectance angles close further, then progressively open. Accordingly, at a scene point 42, a pair of vectors V5 and V6 define a reflectance angle RAS equal to the reflectance angle RA4 (the minimum tolerance). Consequently, a pair of parallel belt lines 44 and 45 are defined (from points 40 and 42) in turn defining a band 46 of intolerable reflectance angle points. Accordingly, any marker to be placed on a scene point lying within the band 46 likely should be designated by an illuminator rather than a retro-reflective marker which would be noticeable to the scene viewer 38.

In the above discussion, a minimum reflectance angle was assumed; however, as will now be explained, a technique in accordance herewith may be employed to determine the minimum reflectance angle based on the characteristic of the retro-reflective material and the gain of a screen, e.g. the screen 32 (FIG. 2).

Figure 3:
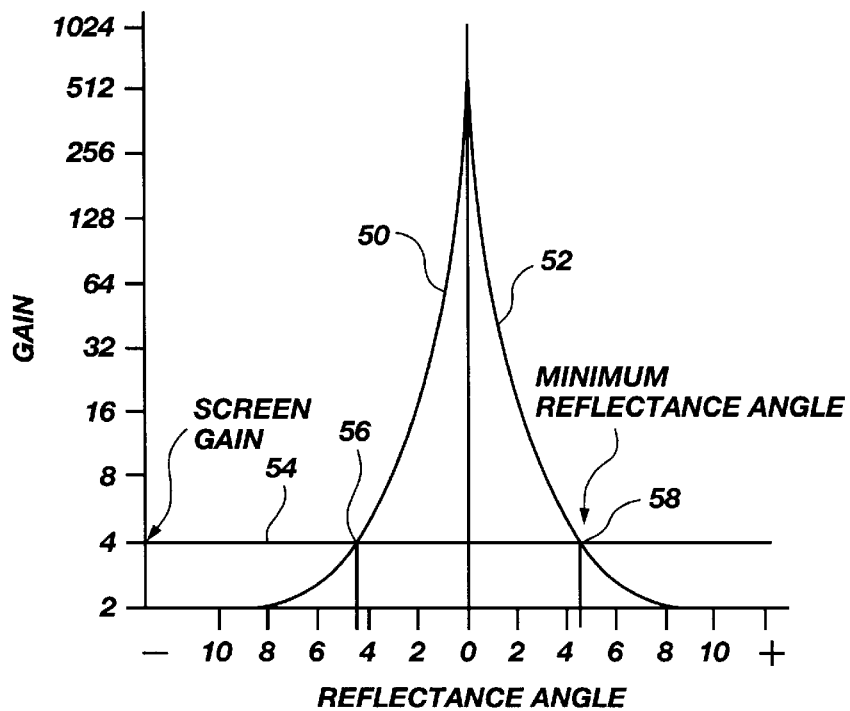
FIG. 3 is a graph illustrating a selection criteria for practicing the process of FIG. 2.

FIG. 3 shows a rectangular coordinate graph with gain (ordinate) plotted against reflectance angle (abscissa). A pair of sharply ascending and descending curves 50 and 52 characterize a retro-reflective material. On the same scale, with respect to gain, a line 54 indicates the unvarying gain of an exemplary screen. Intersection points between the line 54 and the curves 50 and 52 are indicated at locations 56 and 58. Consequently, for the represented materials, the minimum reflectance angle is indicated to be somewhat greater than 4° either positive or negative. Thus, as determined and implemented, a reflectance angle was utilized to determine the band 46 (FIG. 2) translated to a non-linear display screen in which retro-reflective markers were avoided.

Figure 4:
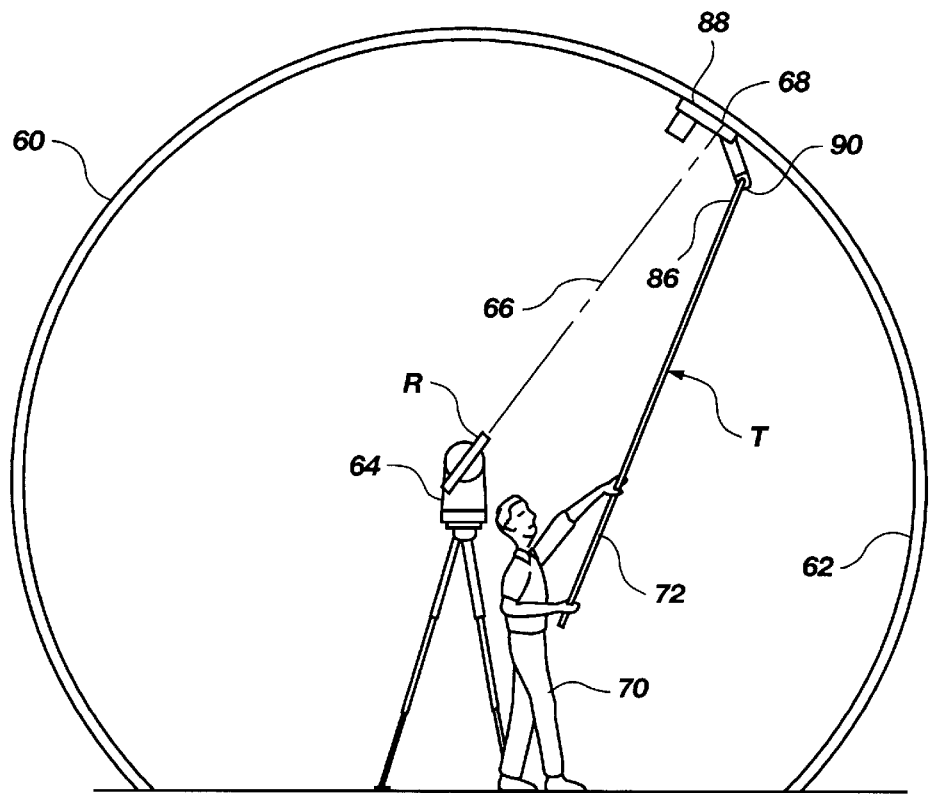
FIG. 4 is a sectional view illustrating a tool in accordance with the present invention and its manner of use.

In view of the above considerations, the process of constructing a projection system in accordance herewith will now be considered in greater detail (FIG. 4). In that regard, a dome 60 defines an internal surface to function as an internal spherical viewing screen 62. Any of a variety of reflectance mediums may be deposited on the concave surface of the dome 60 in accordance with specific design criteria to accomplish the desired screen characteristics.

With the screen surface accomplished, the next step involves specifying individual locations on the screen 62 to function as calibration points as indicated above. For example, a regular array of points may define a grid over the cylindrical surface. With such an array defined, a survey instrument 64 is set up in the dome 60 and incorporating a laser to provide a beam 66 for sequentially designating each specific spot or array-point target 68 on the screen 62. In that regard, survey instruments incorporating a laser R are well known and widely used in the art.

With the laser beam 66 marking the target 68, an operator 70 uses a mounting tool T with an elongate handle 72 to place retro-reflective dots at locations designated as targets 68. The ultimate operation of the tool T is to deposit adhesively secured markers MA (FIG. 5) at calibration locations as designated by dashed lines 74.

Figure 5:
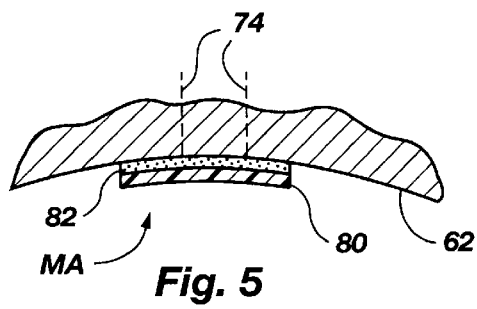
FIG. 5 is vertical sectional view of a fragment of the structure of FIG. 1.

As illustrated in FIG. 5, the marker MA includes a retro-reflective layer 80 and an adhesive layer 82. Accordingly, with meaningful pressure applied to the marker MA, it is securely affixed to the screen 62. In one embodiment, markers of a circular configuration have been employed successfully with a diameter of 1/16 inch. Generally, the preferred form of the markers appears to be of a diameter that is a function of screen radius.

The tool T (FIG. 4) incorporates a shaft 86 as part of the handle 72 held by the operator 70 to position an application mechanism 88 in various positions adjacent to the screen 62. A spring arm 90 affixed to the shaft 86 along with the applicator mechanism 88 assist the operator 70 in maintaining the desired positions. Considering the applicator mechanism 88 in greater detail, reference now will be made to FIG. 6.

The shaft 86 (FIG. 6) receives a mounting block 92 which houses controls and an actuating mechanism. Specifically, a sleeve 94 is mounted for rotation on a concentric axle 96. The sleeve 94 carries a radial arm 98 which in turn carries a pod or punch assembly 102 (left). As the sleeve 94 revolves, the punch assembly 102 is reciprocated axially by the control 92 through a mechanical link represented by a dashed line 106. Consequently, as indicated by an arrow 107, the punch assembly 102 is cycled (angularly and axially) between a loading position and an application position (indicated in dashed lines).

In the loading position the punch assembly is aligned with a platen 116 affixed to a circular base plate 112. The platen 116 is revolved on a circular plate 112 by the control 92 acting through a mechanical link represented by a dashed line 114. Thus, the punch assembly 102 is alternatively positioned to load (loading position) and apply (application position) marker dots from a laminar retro-reflective sheet 116.

Figure 7:
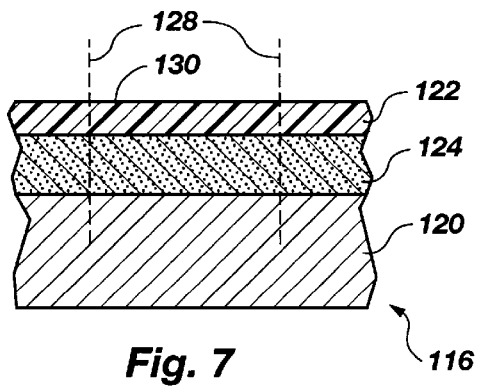
FIG. 7 is a sectional view of sheet material as used in the tool of FIG. 6.

A grossly enlarged, fragmentary section through the sheet 116 is illustrated in FIG. 7. A release sheet 120 (bottom) carries a retro-reflective layer 122 on an adhesive layer 124. Essentially, the punch assembly 102 encounters the sheet 116 on the platen 110 to load a dot 130. That is, the loading punch assembly pierces the sheet as indicated by the dashed lines 128 to withdraw a circular dot 130.

Note that in cutting a dot 130, the release sheet is not severed and accordingly remains whole. Thus a dot 130, as carried by the punch assembly 102 has the adhesive layer 124 exposed. After each dot 130 is cut, the platen 110 is revolved to present a fresh section of sheet 120 for the next cycle of the assembly 102 to cut and extract a dot 130.

Figure 6:
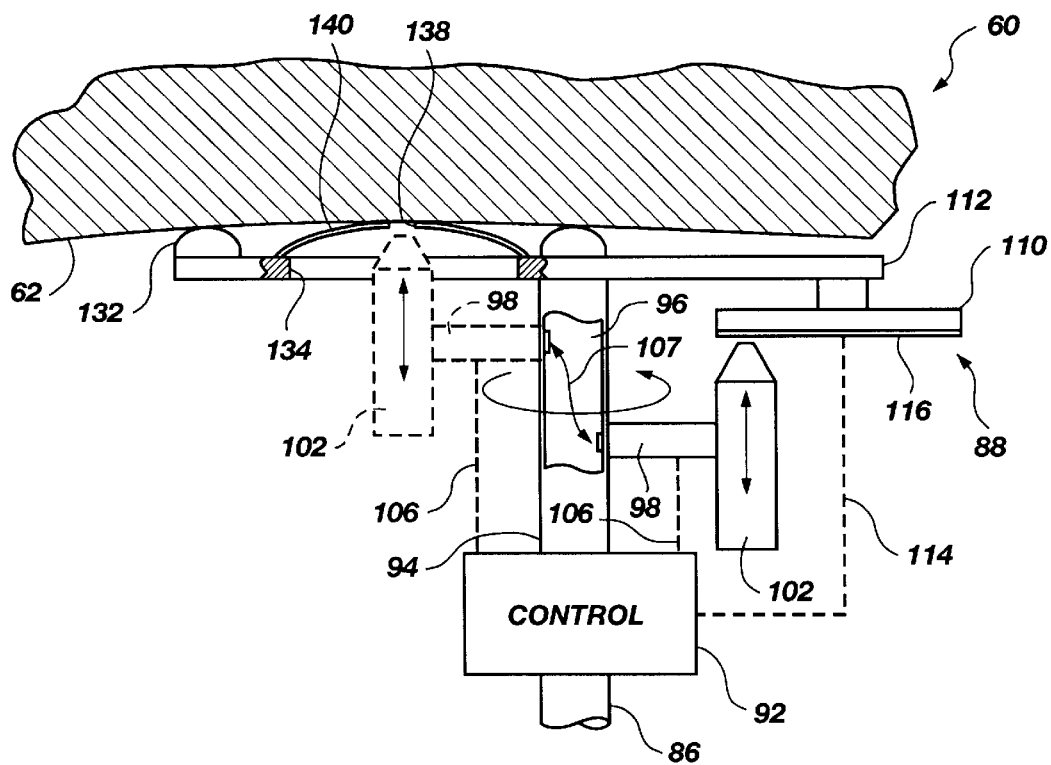
FIG. 6 is a sectional side elevation of the tool of FIG. 4.

Loaded with a marker dot 130, the punch assembly 102 is cycled (moving in a spiral pattern) to the application position occupied as illustrated in dashed lines in FIG. 6. In that position, the punch assembly is actuated to deposit the dot 130 and provide a permanent calibration point marker M.

The alignment of the applicator mechanism 88 (see FIG. 4) involves a targeting structure that is integral with the base plate 112 (FIG. 6). Specifically, cushion pads 132 on the base plate engage the screen 62 for support. Additionally, it may be desirable in certain instances to cant the application mechanism 88 with respect to the shaft 86. An angular offset may afford greater convenience in locating individual calibration points and setting markers.

In the depositing or application position (see punch assembly 102 in dashed lines) the assembly 102 extends through a bore 134 in the base plate 112 for accessing the screen 62. However, when the rotary structure is in the loading position, a clear view exists through the bore 134 and a target opening 138 in a sight plate 140. Consequently, the laser beam 66 (FIG. 4) from the survey instrument 64 can be aligned to pass through the sight plate 140 centered in the target opening 138. That position is held until the control 92 is triggered to actuate the assembly and deposit a dot 130 on the screen 62.

In the operation, the cylindrical sleeve 92 (carrying the punch assembly 102) is cycled between the loading position and the application position, being reciprocated in each to respectively cut and load a dot 130 then deposit the dot. Of course any of a variety of mechanisms may be utilized.

Figure 8:
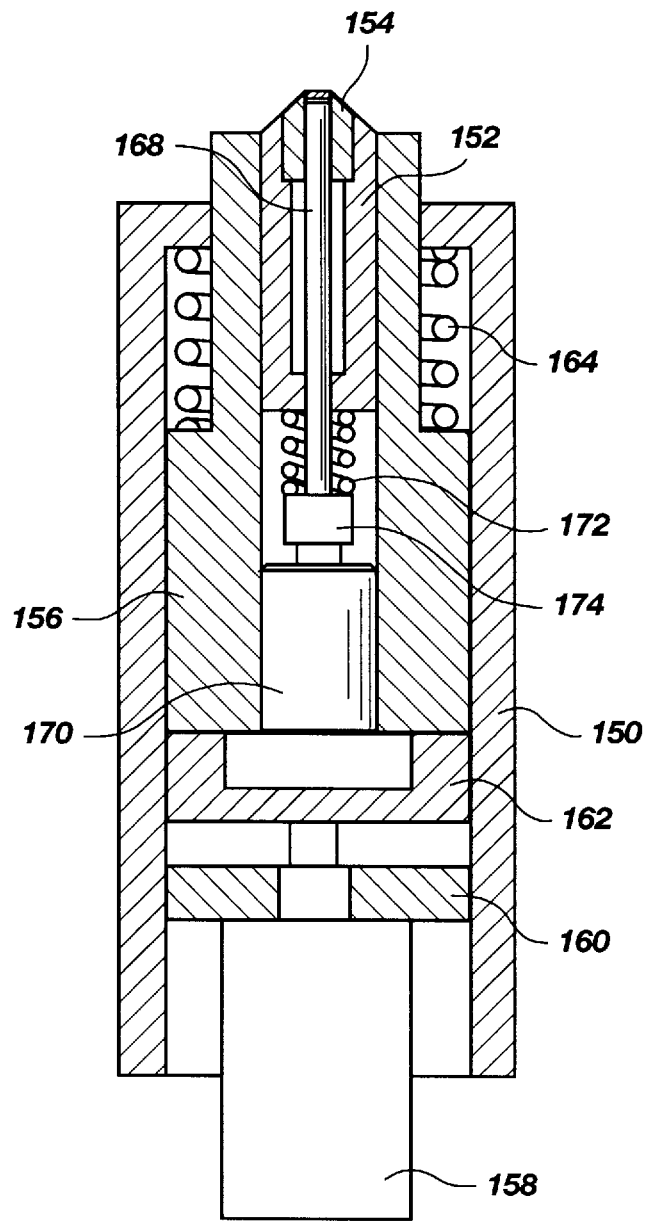
FIG. 8 is a sectional view of a portion of the tool of FIG. 7.

The punch assembly 102 will now be described in detail with reference to FIG. 8. It is housed in an outer sleeve 150 which attaches to the punch positioning mechanism as described with reference to FIG. 6. Assume that initially, the assembly 102 is in the loading position.

Concentrically fixed within the sleeve 150 are a pair of reciprocating mechanisms, one for cutting and retrieving a dot, the other for depositing the dot. Specifically, for cutting the retro-reflective dots, a cylindrical punch 152 with a replaceable tip 154 is slidably mounted in a drive sleeve 156 that coaxially reciprocates within the outer sleeve 150. The drive sleeve 156 is pushed downward by a load solenoid 158 to compress a coil spring 164. The drive force of the load solenoid 158 is applied to the drive sleeve through a support 160 and a drive plate 162. Opposing the force of the load solenoid 158 is the coaxial coil spring 164.

When the punch assembly is in the loading position (no dot in tip 154) the load solenoid 158 is actuated by a voltage pulse that impacts the punch tip 154 against the retro-reflective material (sheet 116, FIG. 6) with sufficient force to cut through the thin retro-reflective material 122 as indicated by the dashed lines 128 (FIG. 7) but not through the release sheet 120. Because of the small size of the dot 130, the force of the punch tip 154 deforms the backing so that the dot is separated and retained.

With the punch assembly 102 loaded, it is moved from the loading position (FIG. 6) to the application position as indicated in dashed lines.

To apply the dot 130 to the screen 62, a ramp voltage is applied to drive the solenoid 158 which presses the punch tip against the screen surface. Inside the punch, a set pin 168 then is actuated by a setting solenoid 170. A voltage applied to the setting solenoid 170 drives the pin 168 forcing the dot from the tip 154 to be adhesively secured on the screen 62. With the release of the solenoid 170, a spring 172 returns the setting pin 168 to its prior position. Essentially, the spring 172 and a collar 174 hold the set pin 168 in its retracted position.

In view of the above descriptions and to perfect a comprehensive understanding of the disclosed embodiments, some final comments are deemed appropriate with regard to the process and structure. In that regard, the dome D (FIG. 1) may be variously formed using any of a variety of techniques in the art. In that regard, the completion of the dome as a projection structure involves providing a screen 16 on the concave surface with the desired reflectance characteristics. With the dome supported, the positions of the projection apparatus 34 and the viewer (or viewers) is established (FIG. 2) as well as the minimum reflectance angle (FIG. 3). By analysis, as described with respect to FIG. 2, a band 46 is determined in which retro-reflective markers are not used. With the layout of the calibration point array (individual point locations), the surveying instrument 64 (FIG. 4) along with the application tool T is used to locate and apply retro-reflective dots 130 (FIG. 7). Finally, illumination devices, as the fiber optic bundles 20 and 24 are provided at locations of the dome D (FIG. 1) which fall within the band defined by the minimal reflectance angles. Accordingly, the projection apparatus is complete and effective for aligning the projection apparatus P (FIG. 1) and to accomplish effective displays for the viewer V.

In view of the above explanation of exemplary embodiments, it will be appreciated that other embodiments of the developments may be employed in many applications to attain an effective projection apparatus. While certain exemplary operations have been stated and certain detailed structures have been disclosed, the appropriate scope hereof is deemed to be in accordance with the claims as set forth below.

What is claimed is:

1. A tool for applying retro-reflective dots from a sheet of retro-reflective material to a display screen to identify defined calibration points for spacially aligning images, said tool comprising:

a support platen for said sheet of retro-reflective material;

a punch mechanism for punching dots of material from said sheet of retro-reflective material;

a carrier for said punch mechanism for variously supporting said punch mechanism with respect to said support platen for taking dots from said sheet of retro-reflective material;

a transport mechanism for transporting said punch mechanism to a position remote from said support platen and for activating said punch-mechanism to deposit a dot of material from said sheet of retro-reflective material on said screen at a calibration point; and a frame affixed to support said support platen, said punch mechanism, said carrier and said transport mechanism.

2. A tool according to claim 1 wherein said punch mechanism incorporates a solenoid for actuation to punch a dot.

3. A tool according to claim 1 wherein said carrier comprises a rotary structure for rotating said support platen with reference to said punch mechanism.

4. A tool according to claim 1 wherein said transport mechanism includes a rotary structure for revolving said punch mechanism from a loading position to a deposition position.

5. A tool according to claim 1 further including a target structure for alignment of said tool with reference to a laser beam.

6. A tool according to claim 1 further including an elongate handle affixed to said frame.

* * * * *